Figure 1:
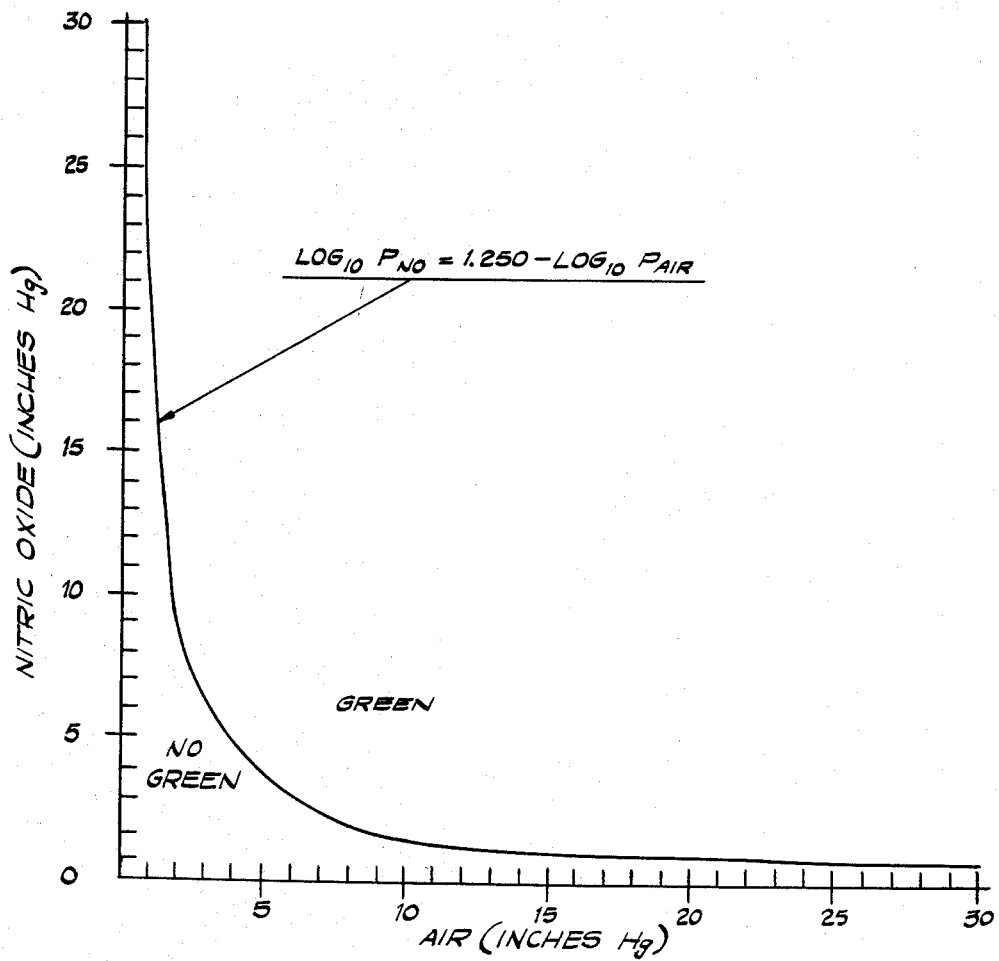

United States Patent Office 3,069,272
Patented Dec. 18, 1962

3,069,272
PROCESS FOR DESTROYING MICROSCOPIC
ORGANISMS IN MEAT
Robert H. Harper, Park Forest, Ill., assignor to Swift & Company, Chicago, Ill., a corporation of Illinois
Filed Mar. 29, 1960, Ser. No. 18,412
18 Claims. (Cl. 99—157)

This invention relates to the treatment and curing of meat, and more particularly provides a process for the destroying of microscopic organisms in meat. This application is a continuation-in-part of my prior application Serial No. 644,793, filed March 8, 1957, now Patent No. 2,930,703.

Historically, the presence, or suspected presence, of certain microscopic organisms in meat has caused the wasteful destruction of such meat because there was no effective and commercially practical method for destroying such organisms. In other instances, the known or suspected presence of certain microscopic organisms in meat requires it to be subjected to prolonged and often costly processing. Specifically, viruses such as the *Hostis pecoris* virus, or hoof and mouth disease in cattle and swine, the *Variola vaccina* virus in cattle, and the *Miyagawanella ornithosis* virus in poultry frequently require the total destruction of the infected animal population. Parasitic microscopic organisms such as the *Trichinella spiralis* in swine still require prolonged curing and costly processing of pork products to protect the consumer against trichinosis. The destruction and control of surface molds is recognized as an inherent problem in the processing and handling of certain cured meats. Bacterial contamination of meats, including acid forming varieties and the putrifying and disease spreading varieties, remains a problem in the processing and handling of meat.

Accordingly, this invention has as its primary object a process for destroying microscopic organisms in meat by contacting said organisms with extraneous nitric oxide in an oxygen free atmosphere, or substantially free atmosphere.

As is disclosed in my copending application, S.N. 644,793, the formation of a cured color in meat by contacting with nitric oxide occurs substantially instantaneously even in very low concentrations of nitric oxide. Therefore, though substantial reduction occurs incidentally in the process of the aforementioned application, and even, in some instances, total destruction of certain kinds of microscopic organisms result under conditions required for effecting a cure and producing a cured color in meats, generally a longer contacting period of the meat with nitric oxide is required to effect total destruction of microscopic organisms. Accordingly, although it is not a primary purpose of this invention, the destroying of microscopic organisms in meat by contacting with nitric oxide will produce the cured color in the treated meat.

Another object of this invention is to provide a process for destroying bacteria and bacterial spores in and on the outer surfaces of meat.

Another object of this invention is to provide a process for destroying virus in meat.

Still another object of this invention is to provide a process for destroying Trichinae in meat, thereby permitting a reduction in the cost and time conventionally required for the processing and cooking temperatures.

A further object of this invention is to provide a process for destroying mold spores such as those contaminating the outer surfaces of dry cured sausage.

Another object is to kill the hoof and mouth virus such as is found in beef and pork; thereby making available new sources of these meats heretofore prohibited such as Argentine beef.

Another object of this invention is to provide a process for destroying the cowpox virus in beef.

Another object is to provide a process for destroying ornithosis virus in poultry products.

A further object of this invention is to provide a process for destroying and/or reducing to safe levels, microscopic organisms in meat trimmings used in the manufacture of sausage, so that the trimmings can be stored under refrigeration and not frozen as has been required heretofore.

Another object of this invention is to provide a process for destroying microscopic organisms in cooked meats.

A still further object of this invention is to provide a process for the total destruction of certain microscopic organisms while merely reducing the number of other microorganisms to a safe level.

These and other objects and advantages of the present invention will be readily apparent to those acquainted with the packing industry.

Generally, the present invention comprises contacting meat with preformed nitric oxide in an oxygen free or substantially free atmosphere in concentrations and for periods of time sufficient to destroy all microscopic organisms, or if not destroyed, to render them harmless. The exposure time with nitric oxide required to destroy microscopic organisms in meat is such that a cured color is produced in the meat treated. The expression "meat" employed herein is used in a broad sense of applying to the flesh of edible animals, including, without limitation, domesticated quadrupeds, fowl and fish, except in such cases as the context clearly indicates otherwise.

In the drawings:

FIGURE I is a graph illustrating the relationship that must be maintained between the nitric oxide gas employed in the sterilizing process and the oxygen that is present for the reaction with the nitric oxide.

I have found that sterilization of meats may be accomplished in any form or stage of processing with the use of preformed, i.e. extraneous nitric oxide. In the process of my invention, I prefer to contact the meat with preformed nitric oxide in an oxygen free atmosphere. The terms "preformed" and "extraneous" are used herein to distinguish from such conventional processes as the use of nitrate and nitrite salts in the curing of meat which result in nitric oxide being produced in situ as a result of the metabolism of the bacteria in the meat. Destroying microorganisms with nitric oxide permits a more direct and rapid method for producing safe wholesome meat, whether for the purpose of storage, immediate processing or shipment.

As in the curing of meat with nitric oxide, the destruction of microscopic organisms with nitric oxide gas will, upon occasion, cause the meat to develop a greenish discoloration. This color will vary from a faint greenish tint to a very strong green color. In some instances, the light greenish color appears only in isolated spots on the product, while as the discoloration becomes more intense, the size of the areas of the greenish discoloration also increase. I have discovered that, ignoring time, this discoloration, which is a breakdown of the heme portion of the pigments, is a result of the relationship of the nitric oxide present as compared to the amount of oxygen present. Furthermore, there is a very definite line of demarcation between these relationships of nitric oxide to oxygen which will not produce greenish discolorations and those areas in which the greenish discolorations commence to appear. If the time of exposure of the meat to the combination of nitric oxide and air is very short, relative concentrations of the two can be ignored as long as there is sufficient nitric oxide introduced to the meat to afford the desired degree of sterilization. Just what is the maximum time of such exposure to the combination of nitric oxide and air that can be maintained without greening, I do not know, but it is well under 30 seconds. However, in the practice of this invention which is the destruction of microscopic organisms in meat, the exposure time of the meat to nitric oxide is substantially longer than is required to produce the cured color. For this reason, I have found it preferable to contact the meat in an oxygen free atmosphere.

The appearance of the green color caused by nitric oxide on the meat does not represent any inedibility of the product, nor any factor that would cause the meat to upset the human digestive system. However, the unacceptability of the green color is understandable since this color is contrary to what the meat consumer historically has come to accept. The consumer upon seeing this greenish appearance is likely to believe that something has gone wrong with the meat and even that the meat may be inedible. When meat has been held under unsanitary conditions, or without sufficient refrigeration, the bacterial growth may often result in a similar greenish discoloration. When the bacteria have developed to an extent sufficient to produce this greenish discoloration, the product may often be beyond the stage where it is an acceptable food product; that is, it may produce digestive upsets. Thus, while the greenish discoloration due to the use of nitric oxide in curing and sterilization will not result in any inedibility of the proeduct, it becomes unacceptable to the consumer because of the consumer's association with an undesirable condition in the meat resulting from other causes and signifying a likely inedibility of the product.

Referring to FIGURE I, this figure illustrates the line of demarcation between the concentrations of nitric oxide gas in relation to the concentrations of air that will produce greening as compared to those that will not green the product, when times longer than about 30 seconds are involved. The area below the curve indicates the area within which a cure or sterilization of the meat may be effected without resulting in a greening of the meat. The curve making the demarcation between the green and the no green area is described by the formula:

$$\log_{10}P_{NO} = 1.250 - \log_{10}P_{Air}$$

where $P_{NO}$ and $P_{Air}$ respectively refer to the partial pressure of nitric oxide and the partial pressure of air. Thus, if the sum of the logarithm of the base 10 of the partial pressure and the nitric oxide plus the logarithm to the base 10 of the partial pressure of the air present, if any, is equal to or less than 1.250, no greening will result.

Theoretically, there is a portion of the area below the curve of FIGURE I that will not produce an acceptable cured or sterile product because of the insufficient amounts of nitric oxide being present to effect complete sterilization. However, this portion of the area below the curve could not be drawn, for it would take a graph many times the size of FIGURE I to show where along the abscissa no sterilization could be effected. This is readily apparent when one considers that a line which would represent one part per million of nitric oxide could not be drawn on FIGURE I and be distinguishable from the abscissa of that figure, yet a cure can be obtained with this nitric oxide concentration.

The following examples illustrate the effect of preformed nitric oxide of various types of microscopic organisms found in meat, and some of the different methods of contacting meat therewith.

*Example I*

The work of this example was undertaken to illustrate the treatment of processed meat with preformed nitric oxide and the effect of preformed nitric oxide on mold spores which frequently contaminate the surface of cured meats during processing and which are converted from the spore to the vegetative stage after the meat leaves the possession of the processor. In this experiment, samples of Genoa salami, a dry-cured, uncooked and unsmoked sausage; and, Mortadella, a dry-cured, cooked and smoked sausage, were selected. A control sample of each was boxed and shipped in accordance with customary procedures. A test sample of each was boxed and placed in a vacuum chamber. All samples were selected from identical lots and were free from mold mycelia. The atmospheric oxygen was withdrawn from the vacuum chamber by vacuumization, the vacuum chamber back-filled with one-sixth atmosphere of preformed nitric oxide and held for 10 seconds. Thereafter, both samples were shipped to Puerto Rico allowing a lapse of time of 30 days between the date of shipment and the date the samples were examined. Upon examination, both of the control samples were found to have mold mycelia covering the outer surface, whereas both the test samples were entirely free from mold mycelia. The mold was of the Penicillium species, which is the most common mold found in dry sausage. The advantage illustrated by this experiment is that mold spores which are inherently associated with the process in cured meats can be destroyed by contacting with preformed nitric oxide. The non-criticality of the level of nitric oxide required to kill mold spores was shown in similar experiments wherein product was exposed for periods of time considerably in excess of 10 seconds with no adverse effects, and the spores were killed.

In view of the above indicated lack of criticality of conditions required to kill mold spores, other procedures can be used equally well including use of an atmospheric pressure of preformed nitric oxide, use of nitric oxide under a positive pressure, e.g. one atmosphere, mixture of preformed nitric oxide in inert gases such as nitrogen, use of saturated aqueous solution of nitric oxide to spray, soak, bathe—or even packing product in ice made from aqueous solution (saturated) of nitric oxide.

*Example II*

The work of this example was undertaken to illustrate the treatment with preformed nitric oxide of raw pork trimmings such as may be stored by refrigeration prior to being used in the manufacture of sausage, and the effect of nitric oxide on bacteria, bacterial spores and trichinae in meat. The meat for this experiment was derived from pigs which have been fed trichinae infested rat meat eight weeks prior to slaughter. After slaughter, trimmings were selected, having 80% lean meat and upon examination found to be heavily infested with viable trichinae and a natural flora of both anaerobic and aerobic bacteria. These trimmings were cut into one-half inch cubes and mixed following which 15–30 gram samples of these trimmings were placed in 250 ml. vacuum flasks and the atmospheric oxygen removed by vacuumization. Each flask was then back-filled with preformed nitric oxide to atmospheric pressure, sealed and held at 35° F. for intervals ranging up to 72 hours. After 24 hours, the first samples were examined and found to have some reduction in the number of all organisms present. Samples tested after 48 hours showed that both the aerobic and anaerobic bacteria has been destroyed, but that viable bacterial spores were present and that the viable trichinae had been substantially destroyed. Samples examined after 72 hours were examined and found to be sterile.

The concentration of nitric oxide in the trimmings after 72 hours was found to be about 52 p.p.m.

*Example III*

The work of this example was undertaken to illustrate the treatment with preformed nitric oxide of raw meat being processed in the manufacture of sausage such as the Genoa type, bacterial spores, and trichinae in meat, and the effect of nitric oxide on bacteria. The meat for this experiment was prepared in the same manner as for Example II. The meat was ground through a ¼ inch plate, and mixed, following which 15–30 gram samples were taken and placed loosely in polyethylene Saran laminated bags. The atmospheric oxygen was removed by vacuumization, back-filled with preformed nitric oxide to atmospheric pressure, sealed and held at 35° F. for 24 hours. Examination of 30 gram samples taken immediately after grinding showed the presence of viable miscroscopic organisms as follows:

|  | Average duplicate analysis |
|---|---|
| Aerobic bacteria | 1,000,000 |
| Anaerobic bacteria | 50,000 |
| Trichinae | Heavily infested |

Examination of 8–30 gram samples after holding 24 hours in preformed nitric oxide indicated:

|  | Average duplicate analysis |
|---|---|
| Aerobic bacteria | 100,000 |
| Anaerobic bacteria | 12,000 |
| Trichinae | None |
| Viable bacterial spores | None |

The bacterial count found after holding in nitric oxide for 24 hours is substantially lower than the levels considered satisfactory for commercial use for manufacture of sausage. The advantage of obtaining a trichinae-free meat after 24 hours is that it substantially reduces the holding period currently required by the U.S. Department of Agriculture to insure a trichinae-free dry sausage, which period ranges up to 45 days. It also permits the full utilization of technical advancement in the processing of cured meats such as use of cultures for the rapid development of flavor and texture, and equipment for rapid drying. The pork trimmings treated with nitric oxide for 24 hours were processed using both culture and rapid drying techniques, and a satisfactory product comparable to product requiring 90–100 days under current processing conditions was produced within ten days. The concentration of nitric oxide in the trimmings after 72 hours was found to be 52 p.p.m.

*Example IV*

The work of this example was undertaken to illustrate the treatment of raw meat infested with virus, by contacting it with preformed nitric oxide and its effect on virus in meats. In this experiment a whole beef carcass infested with *Vesicular stomatitis* virus was boned and ground through a ¼ inch plate. A representative sampling of the ground meat was then transferred to a vacuum mixer, the atmospheric oxygen removed by vacuumization, and the mixer was then back-filled with preformed nitric oxide to atmospheric pressure. The meat was mixed for one minute to insure contacting all meat surfaces with nitric oxide, excess nitric oxide removed, and the meat transferred to a polyethylene Saran laminated bag and held at 35° F. for 72 hours. The meat was then examined for viable virus and found to be sterile. The concentration of nitric oxide in the meat at the end of the exposure time was 52 p.p.m. The advantage illustrated by this experiment is that the contacting of raw meat infested with virus such as *Hostis pecoris* virus, or hoof and mouth virus which infects animals such as cattle and swine, ornithosis virus, which affects poultry, and cowpox virus, which affects beef, can be effectively destroyed, thereby allowing the availability and importation of meat of animals which have heretofore been destroyed.

*Example V*

The work of this example was planned to show that ornithosis virus (*Miyagawanella ornithosis*) can be effectively killed by treatment with nitric oxide. For this purpose, infected chickens were killed and prepared in "cut up" condition. The parts of 10 chickens were so prepared and transferred to a polyethylene Saran bag. The entrapped air was removed by vacuumization and the bags back-filled with nitric oxide to atmospheric pressure. The bags were worked to insure contacting all surfaces with nitric oxide and sealed and held at 35° F. for later examination.

Examination for viable virus showed reduction at 2, 10, 24, 36, and 48 hours, however, the meat was sterile at 72 hours.

In the foregoing examples "vacuumization" referred to the preferred method of removing oxygen; however, many modifications can and have been used in similar experiments. These include alternate partial vacuumization and flushing with nitrogen, squeezing out air from bags. Any similar procedure to reduce oxygen re FIGURE I greening curve will work satisfactorily e.g. thorough flushing with nitrogen, or other inert gas.

Obviously, many modifications and variations of the invention as hereinbefore set forth may be made without departing from the spirit and scope thereof, and therefore only such limitations should be imposed as are indicated in the appended claims.

I claim:
1. A process for sterilizing meat, comprising the steps of removing the atmospheric oxygen and contacting said meat with preformed nitric oxide for a period from about 24 to about 72 hours effective to kill all microscopic organisms.
2. A process in accordance with claim 1 wherein the meat is raw meat.
3. A process in accordance with claim 1 wherein the meat is cooked meat.
4. A process in accordance with claim 1 wherein the microscopic organisms are bacteria.
5. A process in accordance with claim 1 wherein the microscopic organisms are mold spores.
6. A process in accordance with claim 1 wherein the microscopic organisms are *Trichinella spiralis*.
7. A process in accordance with claim 1 wherein the microscopic organisms are virus.
8. A process in accordance with claim 7 wherein the virus is cowpox virus.
9. A process in accordance with claim 7 wherein the virus is *Hostis pecoris*.
10. A process in accordance with claim 7 wherein the virus is ornithosis virus.
11. A process for destroying virus in raw meat comprising the steps: first, comminuting the meat; second, removing the atmospheric oxygen and contacting with an atmosphere consisting essentially of preformed, extraneous nitric oxide gas at atmospheric pressure; third, mixing the comminuted meat so as to insure all meat surfaces being contacted with the nitric oxide; and fourth, holding at 35° F. for periods ranging from about 24 to about 72 hours and thereafter removing the excess nitric oxide.
12. A process in accordance with claim 11 wherein the virus is *Hostis pecoris* virus.
13. A process in accordance with claim 11 wherein the virus is *Miyagawanella ornithosis* virus.
14. A process in accordance with claim 11 wherein the virus is cowpox virus.
15. A process for destroying substantially all viable trichinae and mold microorganisms in meat and substantially reducing the number of bacteria and virus microorganisms in meat comprising the steps of contacting meat in an oxygen free atmosphere with preformed nitric oxide under pressure of one atmosphere and holding at 35° F. for about 24 hours.
16. A process for destroying mold mycelia and mold spores on the outer surfaces of cured meats comprising: removing the atmospheric oxygen from the cured meat, contacting the outer surfaces of said meat with preformed extraneous nitric oxide up to about atmospheric pressure for about 10 seconds and removing the excess nitric oxide.
17. A process for destroying *Trichinella spiralis* in meat and meat products comprising the steps: comminuting the meat, removing the atmospheric oxygen, treating the comminuted meat with an atmosphere consisting essentially of extraneous preformed nitric oxide, mixing the comminuted meat to insure all meat surfaces being contracted with said nitric oxide and holding for periods of time from about 24 to about 72 hours, and removing the excess nitric oxide.

18. A process for destroying bacteria and bacterial spores in meat comprising: grinding the meat, removing the atmospheric oxygen surrounding said meat, contacting said meat with preformed extraneous nitric oxide for a period of time from about 24 to about 72 hours at atmospheric pressure so as to produce a concentration of nitric oxide in said meat up to 52 p.p.m., and removing the excess nitric oxide.

References Cited in the file of this patent

UNITED STATES PATENTS 2,930,703    Harper  ---------------- Mar. 29, 1960